Figure 1:
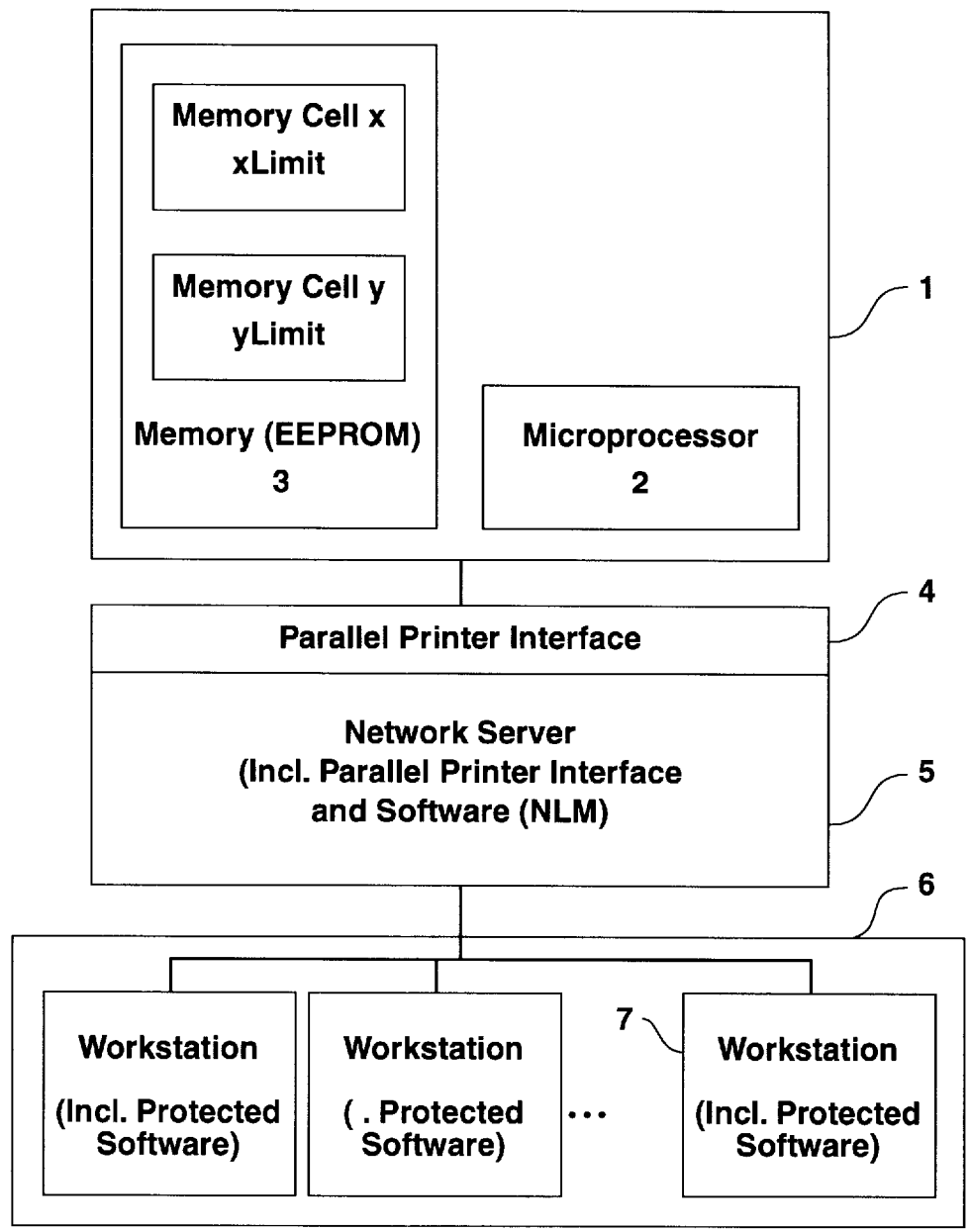

United States Patent
Marx

[11] Patent Number: 5,805,802
[45] Date of Patent: Sep. 8, 1998

[54] MODULE FOR THE PROTECTION OF SOFTWARE

[76] Inventor: Philipp Wilhelm Marx, Vohburger Str. 68, 85104 Pförring-Wackerstein, Germany

[21] Appl. No.: 490,330

[22] Filed: Jun. 14, 1995

[30] Foreign Application Priority Data

Dec. 15, 1994 [DE] Germany ............... 9420092 U

[51] Int. Cl.⁶ .............. G06F 11/00; G04H 9/00; H04K 1/00
[52] U.S. Cl. ............ 395/188.01; 380/4; 380/23; 380/25; 364/286.6
[58] Field of Search ............... 395/186, 187.01, 395/188.01; 380/4, 23, 25; 364/286.4, 286.5, 286.6

[56] References Cited

U.S. PATENT DOCUMENTS

| | | | |
|---|---|---|---|
| 4,932,054 | 6/1990 | Chou et al. | 380/4 |
| 5,014,234 | 5/1991 | Edwards, Jr. | 364/900 |
| 5,081,676 | 1/1992 | Chou et al. | 380/4 |
| 5,109,413 | 4/1992 | Comerford et al. | 380/4 |
| 5,226,080 | 7/1993 | Cole et al. | 380/25 |
| 5,337,357 | 8/1994 | Chou et al. | 380/4 |
| 5,390,297 | 2/1995 | Barber et al. | 395/200 |
| 5,479,612 | 12/1995 | Kenton | 395/186 |
| 5,483,649 | 1/1996 | Kuznetsov et al. | 395/186 |

FOREIGN PATENT DOCUMENTS

| | | |
|---|---|---|
| 0 440 545 | 8/1991 | European Pat. Off. . |
| 0 478 969 | 4/1992 | European Pat. Off. . |
| 0 537 738 | 4/1993 | European Pat. Off. . |

*Primary Examiner*—Robert W. Beausoliel, Jr.
*Assistant Examiner*—Norman M. Wright
*Attorney, Agent, or Firm*—Matthew G. Reeves

[57] ABSTRACT

Module for the protection of software in a computer network comprising a microprocessor for implementing an access control to the software, said microprocessor being connectable via a parallel interface, particularly via a printer interface, with a network server, a programmable storage, being addressable by means of said microprocessor, in which a user limit code Xlimit is stored, and a device for processing said user limit code Xlimit and an actual user number under a processing software, said device being arranged in said module and being addressable by means of said microprocessor.

14 Claims, 6 Drawing Sheets

MODULE FOR THE PROTECTION OF SOFTWARE

TECHNICAL FIELD OF THE INVENTION

The invention relates to a hardware module for the protection of software within a PC network or in a single work station.

The protection of software is rapidly gaining significance. The development of more modern and better performing software requires significant investments. Such expenses can only pay off if the product, the software, is protected against unauthorized use. Particularly in connected multi-station systems unauthorized "over-use" of the licensed software is impending from an increase of work stations which is not agreed upon in the license contract, if these work stations have access to the licensed software.

BACKGROUND ART

The effective protection of software requires the encryption of the program to be protected or of portions thereof. A great number of methods for encrypting has been proposed. In more recent times U.S. Pat. Nos. 5,081,676 and 5,337,357 and European Patent Applications 0 478 969 and 0 537 738 describe the comparison of two identification keys, one of which is stored in the protection system, whereas the other one has to be entered into the system by the user. If the comparison of the identification keys is successful, a third key is computed according to a certain algorithm. With the help of this third key the encrypted portions of the program can be decrypted and thereby enabled to run on the computer. The quality of this software protection is increased with increasing complexity of the used algorithm.

Even complex algorithms, however, can be circumvented, if the process of comparing the identification keys can be easily emulated. The difficulties in emulation depend on the hardware used for the encryption. The more complex the protection device is, the more difficult is the encryption process to understand.

U. S. Pat. No. 4,932,054 describes an example of a software protection device. The protection module is connected to a data port of a computer, which contains the software to be protected. A control code (first identification key) is then compared to a reference code (second identification key) within a PROM. If these codes match, a confirmation code is returned to the computer. The passivity of the protection module results in the opportunity to easily simulate the identification interrogation so that the possibly complex encryption modes can be circumvented.

The use of a microprocessor can provide more safety against decompilation. Such a system is described in the European Patent Application 0 440 545. The identification interrogation can be made much safer by the installation of internal program cycles which are unidentifiable for the user. Furthermore, the encryption and decryption of the software to be protected can be largely removed from external control. However, even such microprocessor protection modules have the drawback, when used in a multiplace system, that the use of the program to be protected is released for all network participants connected, once the protection module was successfully identified by the file server. Since software is regularly only licensed for a limited number of network users, an expansion of the network which was not authorized by the licensor may lead to an unlicensed use which would result in considerable losses of revenues.

OBJECT AND DISCLOSURE OF THE INVENTION

It is therefore the object of the present invention to provide a protection module and a method for the protection of software within a network.

This object is accomplished by the module as described in the claims for the protection of software on a network server or on a work station connected therewith. This module comprises a microprocessor for the execution of the access control to the software, said microprocessor being connected via a parallel interface, particularly via a printer interface, with a network server. Furthermore, the module comprises a programmable storage, which is addressable by means of said microprocessor. In this storage a user limit code Xlimit is stored. The module also comprises a device for processing the user limit code Xlimit and an actual user number under a processing software, wherein said device can be addressed by means of said microprocessor. This processing allows for a comparison of the Xlimit and the actual user number.

Preferred is a module with a second device for processing a second user limit code Ylimit under said processing software, wherein the Ylimit is stored in the programmable storage and said second device is addressable by means of said microprocessor.

Further preferred is a module with a device for processing a module-individual control code and/or a customer individual identity code, which are stored in the programmable storage, under the processing software if the Xlimit is changed. Preferably the module comprises an EEPROM integrated in the microprocessor as a programmable storage. Preferably the programmable storage is designed for the storage of the Xlimit and/or Ylimit, as well as for the module-individual control code and/or the customer-individual identity code for changing the Xlimit.

The preferred embodiments described above can of course be combined with each other according to the needs and desires of the user.

According to the invention also a device for the protection of software in a computer network is provided, which comprises a network server with at least one parallel interface and a module according to the above description, which is connected with the network server via the parallel interface.

The object concerning a method is accomplished by the method described in the claims. The access to a software to be protected, which is stored on a network server or on a work station is controlled by means of a microprocessor arranged in the module, wherein the module is connected with the network server via a parallel interface, particularly via a printer interface. A user limit code Xlimit, which is stored in a programmable storage within the module, said storage being addressable by means of said microprocessor, is processed under a processing software with the help of a device arranged within the module for processing the user limit code Xlimit, wherein an actual user number is determined and compared with the user limit code Xlimit.

Preferably a second user limit code Ylimit, which is stored in the programmable storage, is processed with a second device for processing a user limit code, wherein said device is arranged within the module and communicates with the processing software on the network server.

Preferred is a method, in which a module-individual control code and/or a customer-individual identity code for changing the user limit code Xlimit is stored in the programmable storage and processed by means of a processing software when a change of the Xlimit is desired.

More preferred is a method, in which an EEPROM integrated in the microprocessor is used as a programmable storage. Preferably the Xlimit and/or Ylimit, as well as the module-individual control code and/or the customer-individual identity code for changing the Xlimit is stored in the programmable storage.

Also preferred is a method, in which the device arranged within the module provides a control information as a result of the comparison of the user limit code Xlimit and the actual user number. The comparison is carried out with the help of a processing software on the network server. This control information is configured, depending on the result of this comparison, in a way that the software to be protected is released or not released.

The various preferred methods can be combined with each other to obtain the best result in the respective application.

Another aspect of the present invention is a method for changing the Xlimit of a module for the protection of software in a computer network as described above, wherein the module and a metering device are connected to a network server or a work station of the network via a parallel interface.

The module comprises a microprocessor for implementing an access control to the software, wherein the microprocessor is connectable via a parallel interface, particularly via a printer interface, with a network server or a workstation of the network and a programmable storage which is addressable by means of the microprocessor and in which a user limit code Xlimit is stored. This protection module further comprises a device for processing the user limit code Xlimit, this processing allowing a comparison between the Xlimit and an actual user number under a processing software on a network server of the network, wherein the device is arranged in the module and is addressable by means of the microprocessor.

The metering device comprises an EEPROM in which a supply of user numbers Usupply is stored.

The module is identified by means of a module-individual control code and/or a customer-individual identity code and the metering device is identified by means of a metering device-individual control code under a metering software. The Xlimit of the module and the Usupply of the metering device are determined by means of the metering software stored in the computer network. The Xlimit of the module is increased or decreased by an amount ΔXlimit under the metering software, wherein an increase is admissible only if the Usupply is bigger than or equal to ΔXlimit. The Usupply is accordingly decreased or increased by ΔXlimit, respectively, in correspondence to the Xlimit being increased or decreased by ΔXlimit, respectively.

According to the present invention also a metering device for changing the Xlimit of a module for the protection of software in a computer network as described above is provided.

The protection module comprises a microprocessor for implementing an access control to the software, the microprocessor being connectable via a parallel interface, in particularly via a printer interface, with a network server or a workstation of the network, and a programmable storage, being addressable by means of the microprocessor, in which a user limit code Xlimit is stored. The module further comprises a device for processing the user limit code Xlimit, this processing allowing a comparison is between the Xlimit and an actual user number under a processing software on a network server of the network, wherein the device is arranged in the module and is addressable by means of the microprocessor.

The metering device comprises an EEPROM in which a supply of user numbers Usupply is stored. The metering device is connectable via a parallel interface with the network server or a workstation of the network, and is addressable by means of a metering software stored in the computer network.

Therein, the metering device is identifiable by means of a metering device-individual control code and the module is identifiable by means of a module-individual control code and/or a customer-individual identity code under the metering software.

The metering device is designed to allow the increase or decrease of the Xlimit, respectively, by an amount ΔXlimit, wherein the increase is allowed only if the Usupply is bigger than or equal to ΔXlimit, corresponding to the decrease or increase of the Usupply by ΔXlimit, respectively. Herein, the increase or decrease, respectively, of the Xlimit and the corresponding decrease or increase, respectively, of said Usupply is, according to the design of the metering device, effected under the metering software.

BRIEF DESCRIPTION OF THE DRAWINGS AND BEST MODE OF CARRYING OUT THE INVENTION

FIG. 1: Principal scheme of a module for the protection of software and its arrangement within the network server.

Figure 2A:
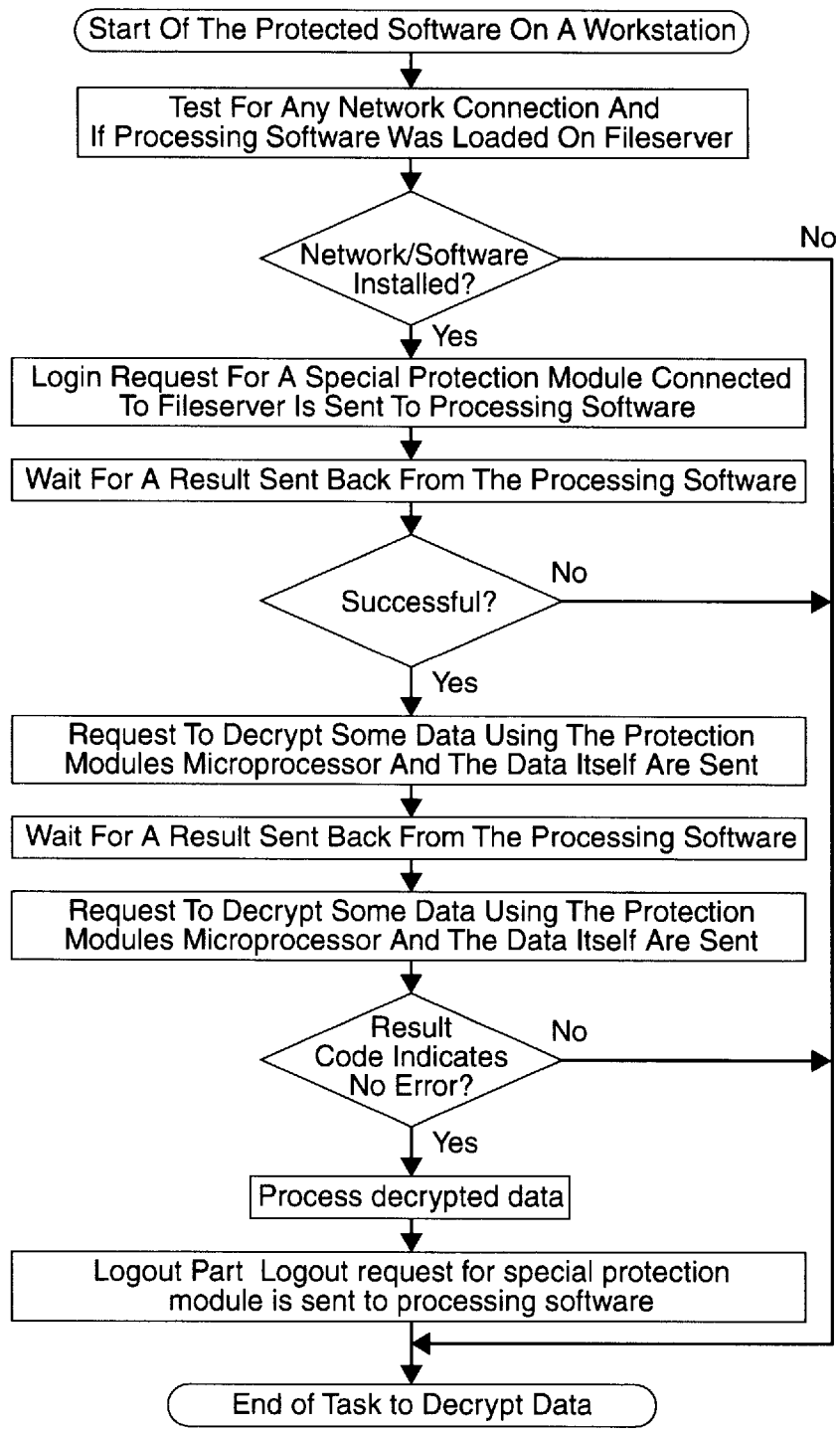
Figure 2B:
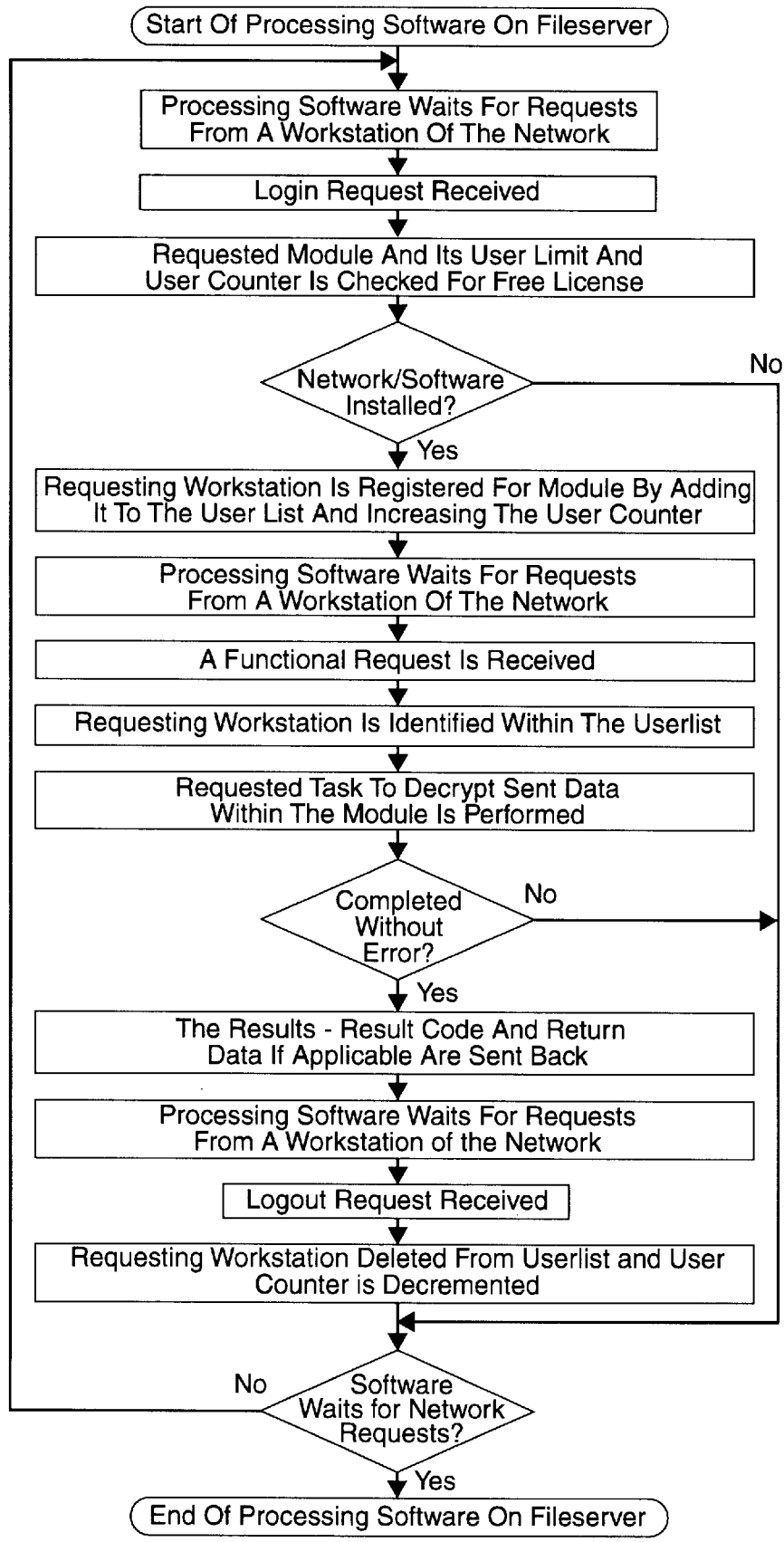

FIG. 2: Flow diagram for protected software and processing software.

Figure 3A:
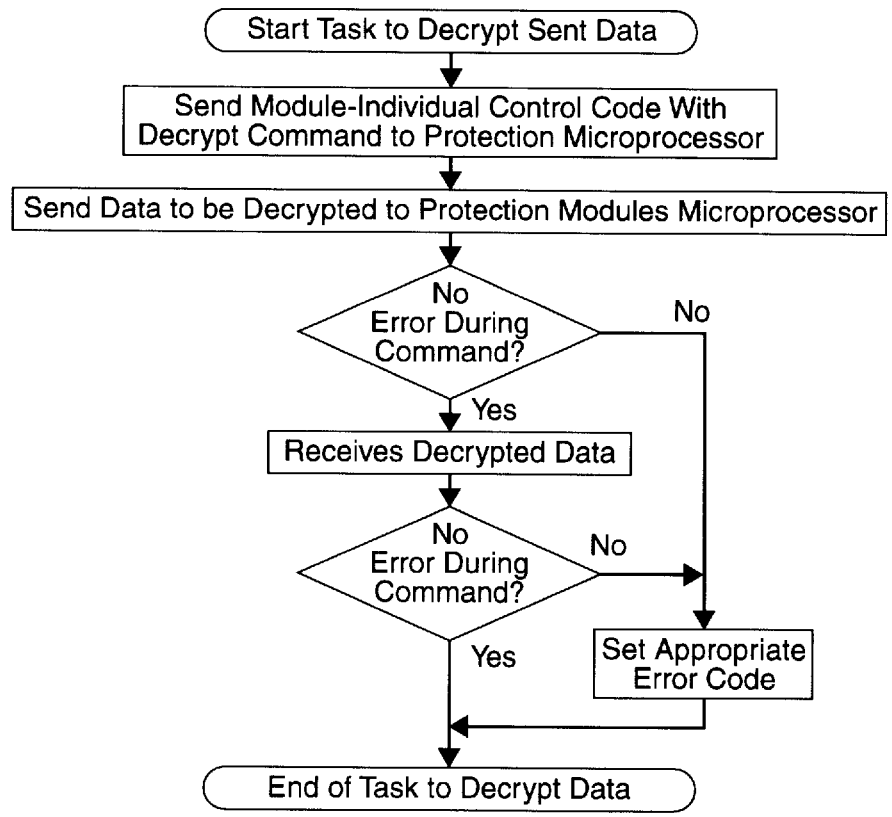
Figure 3B:
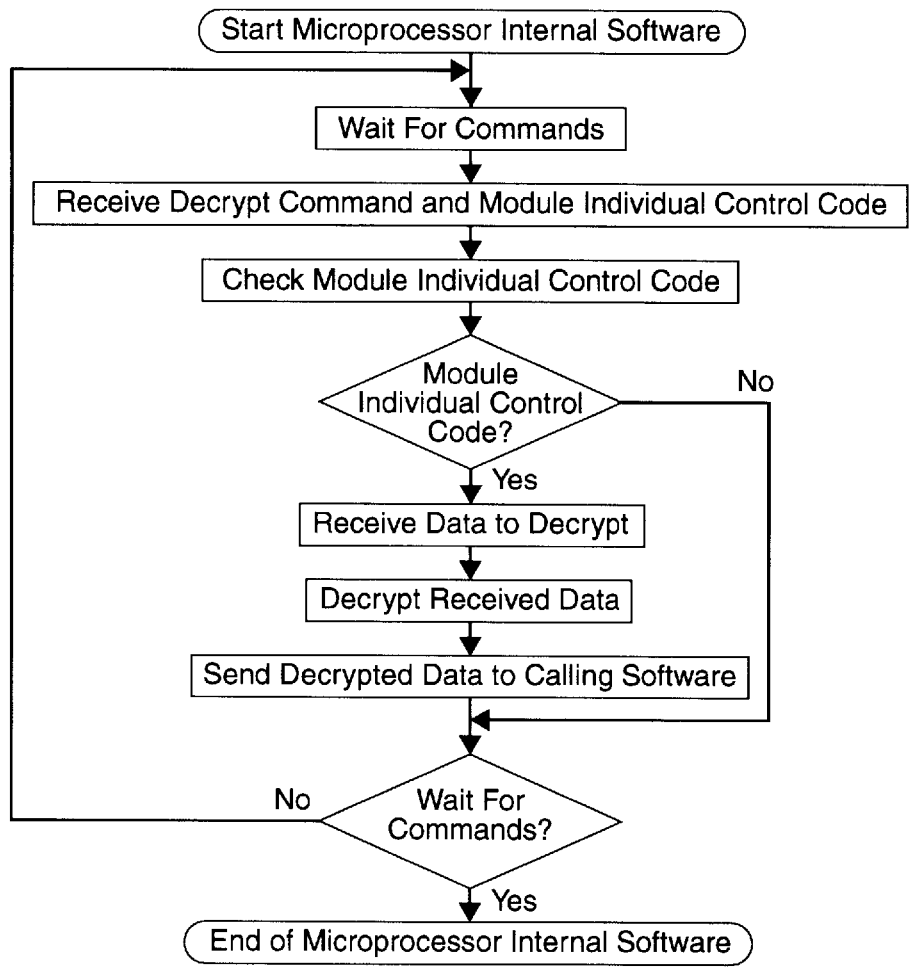

FIG. 3: Flow diagram for processing software and microprocessor activities.

Figure 4:
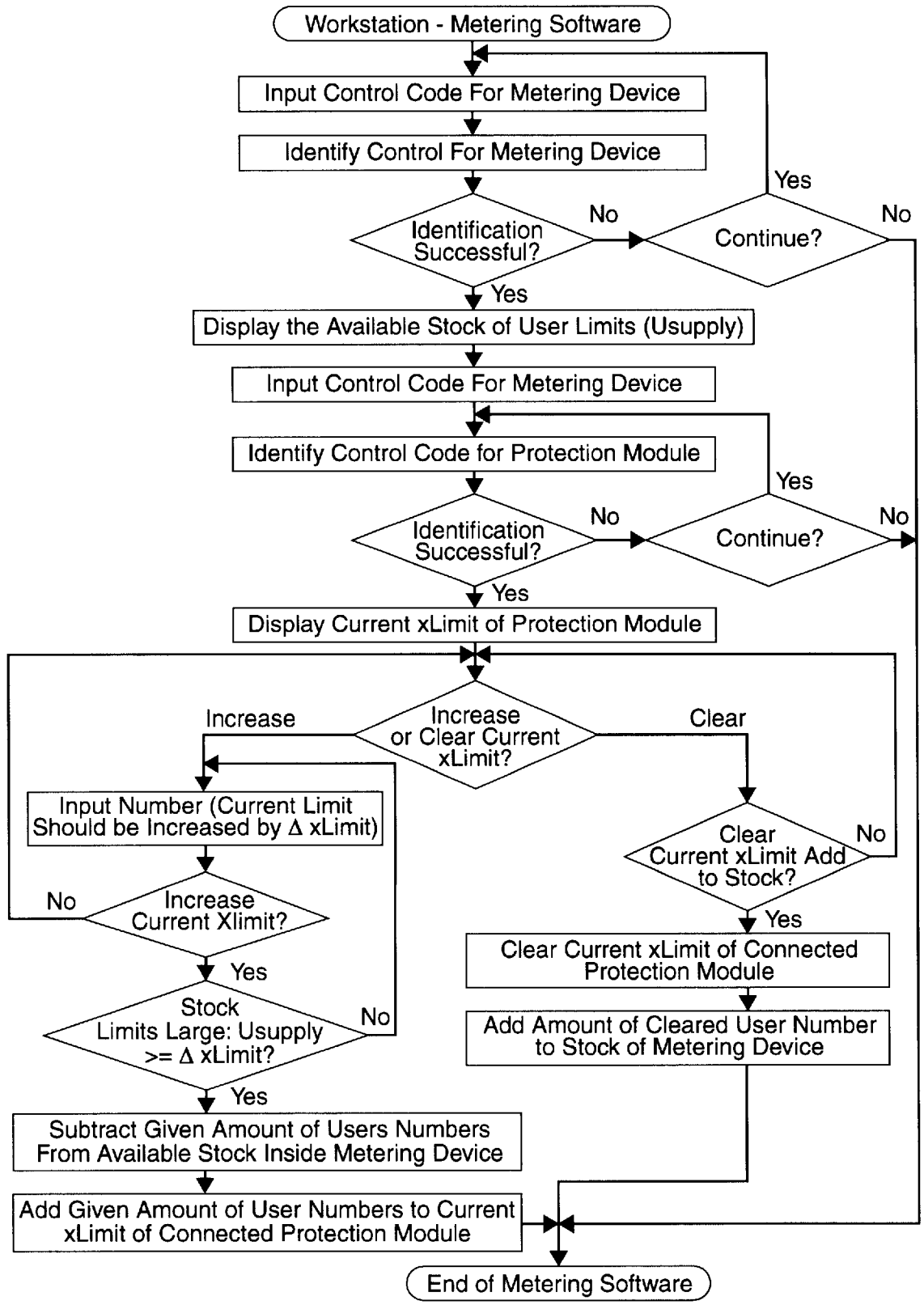

FIG. 4: Flow diagram for metering software.

A module according to the present invention is described in the following with reference to FIG. 1. FIG. 1 shows a principle scheme of the module and its arrangement within the network server.

Module 1 is connected to a parallel printer interface 4 of the central network server 5. In this case the module also works as a through station for the output to the printer. The work stations 7 are connected to the network server via the network 6 in a known manner.

Module 1 comprises its own microprocessor 2 and a separate programmable storage 3, which is an EEPROM here, and which can be addressed by the microprocessor 2. Instead or beside the storage 3, a (further) programmable storage can be provided within the microprocessor.

In FIG. 1, two storage cells X and Y of storage 3 are particularly emphasized, which contain two functionally identical, but differently programmable user limit codes Xlimit and Ylimit. Both codes limit the number of possible users of the licensed software in the network. The user limit Xlimit is being programmed stationary by the manufacturer of the protection module, to set a user maximum. Only the knowledge of the module-individual password allows the software distributor or a third person to change the Xlimit. Contrary to this, the user limit Ylimit can be programmed by the distributor of the protected software or any other authorized third party.

For changing the Xlimit the module-individual control code stored in the programmable storage is read and the module-individual password, which the manufacturer of the modules discloses for example to a software distributor in the case of a permitted change, is entered. From this a customer-individual identity code is calculated and compared with the value stored for it in the programmable storage. If the comparison is positive, the Xlimit can be increased by a certain amount. Otherwise the procedure is terminated by the module.

In one embodiment it is only possible to write Ylimit values into the storage which are smaller or equal to the Xlimit. After the interrogation of both limits, the limits are compared. The smaller value is passed on to the processing software as an effective user limit. In both cases it is secured that the software distributor or any third person does not exceed the limit set by the manufacturer of the protection modules.

Both user limit codes are protected against manipulation of unauthorized persons by the use of a microprocessor in the module in a particular manner. A change can only be effected by the respective authorized persons, i.e. the manufacturer of the module or the distributor of the software.

The control of the user limit codes is integrated in the communication of the protected program with the protection module. A protected program, which shall be started, inquires from the network server about the installation of the processing software (NLM), which is part of the software protection package. In case of a positive answer the protected program applies for a certain protection module. Thereupon the processing software checks whether the correct module is linked with the parallel printer output. This identification interrogation is carried out by transferring a first portion of a module-individual control code to the microprocessor. In case of concurrence with the stored information, the microprocessor returns the second portion of the control code to the processing software. Herewith the module is identified.

Subsequently the user limit codes from the storage of the module are read by the microprocessor. The user number stored in a user counter, which may be implemented for example on the file server, is read by the processing software. A device on the file server for processing the user limit codes compares the lower of the two limits, i.e. the effective limit with the number of users registered at this time by the user counter. If the user number is smaller than the effective user limit, the newly applying work station is admitted to use the software. Otherwise the use is denied.

By interrogating the user limit code by means of the independent microprocessor of the protection module, manipulating the user codes by unauthorized persons is made much harder. A change of the Ylimit can only be effected by the distributor of the software to be protected, a change of the Xlimit only by the manufacturer of the protection module or by the software distributor if the password is given to him. Therefore, the adaption of the user limit to a changed situation is possible at any time, but only by authorized persons.

The present invention therefore allows the safe control of the number of software users in a network.

The best mode for carrying out the present invention is described in the following according to FIGS. 2 to 4.

FIG. 2 shows a flow diagram which describes the activities within the work station on which the protected software is stored and in the processing software on the file server during login, functioning and logout. FIG. 3 accordingly represents the activities within the microprocessor of the protection module in comparison to the activities in the processing software on the file server.

According to FIG. 2 the software to be protected, which is stored on a work station, is started. This software contains an encrypted part, which was designed specifically by the software producer for the use in connection with the present software protection module. It is generally up to the software programmer to chose the appropriate method of encrypting parts of his software. The manufacturer of the protection module only defines the algorithms of encryption and decryption, so that the programmer of the software to be protected can freely chose the part of the software to be encrypted and the extent of such encryption in a wide range.

During the login part the work station asks for the processing software on the file server. If the processing software is installed the work station sends the login request for a special protection module connected with the file server. Then the processing software enquires the microprocessor in the protection module for access. If the module is correctly identified and the user limit is not exceeded, the requesting work station is registered for the module by increasing the user counter by 1.

After the successful login the work station requests the decryption of the encrypted part of the software to be protected from the processing software on the fileserver. After having identified the requesting work station as a registered user the requested decryption of the sent portion of the program is referred to the microprocessor in the protection module. If the microprocessor returns the decrypted data without flaw to the processing software, these data are in turn sent to the work station in order to release the software to be protected.

If no other request is sent by the work station, the logout phase is started. It results in the deletion of the present work station from the user list and the corresponding decrementation of the user counter by 1.

FIG. 3 shows the activities of the processing software described above in connection with the steps taken by the microprocessor of the protection module. In order to identify the protection module a module-individual control code is sent by the processing software and answered by the microprocessor of the protection module. Instead or in addition there can also be sent a customer-individual identity code. After successful identification the decryptor request is carried out by the microprocessor and the decrypted data are sent back to the file server. The encryption and decryption is effected with the help of standard algorithms used for this purpose.

Several error control functions can be inserted in the requests of the work station as well as of the processing software on the file server.

FIG. 4 shows a flow diagram of the metering software for changing the Xlimit of a module for the protection of software in a computer network. This metering software is employed to change the Xlimit of software protection modules by using a metering device ("supply box") for additional user numbers.

In the embodiment shown the metering device and the protection module are connected to a workstation of the computer network. They could as well be connected to the fileserver.

After starting the metering software an identification request is sent to the metering device and the software protection module, the Xlimit of which has to be changed. The identification is carried out by means of a metering device-individual and a protection module-individual control code, respectively. Instead of or in addition to the identification of the protection module by the module-individual control code this identification can also be effected by means of a customer-individual identity code. If the identification is successful, the current value of Usupply is interrogated from the EEPROM of the metering device and displayed to the user of the metering software. Usupply gives the maximum increase of the Xlimits of the individual customer's software protection modules. The additional number of users expressed by Usupply can be added to the Xlimit of a certain software protection module or it can be distributed to several software protection modules, i.e. it can be used to increase the Xlimit of one or of several protection modules.

If the Xlimit of a software protection module should be increased the desired increase ΔXlimit is provided to a metering software. The increase order is carried out, if the comparison Usupply≧ΔXlimit is positive. Only in this case, an increase of the maximum user number Xlimit by ΔXlimit is allowed and carried out. Accordingly, Usupply is then decreased by ΔXlimit.

Instead of an increase of the Xlimit the clearance of the Xlimit of a certain software protection module can be chosen. In this case, the Xlimit is cleared, i.e. set to zero and added to Usupply. That means that the stock of user numbers in the metering device can be increased if the Xlimit of a certain software protection module is undesirably big for the application now envisaged. Thereby, the total user number can also be distributed to more protection modules than before.

The Xlimit can also be reduced by a certain amount and the difference added to Usupply. This procedure not shown here is carried out in accordance with the above described example.

The metering device therefore allows a customer who has bought a bundle of software protection modules with certain Xlimits to vary their Xlimits and to increase or decrease the overall user number according to his needs. In this case, it is not necessary for the customer to know the module-individual password, which would normally be the only way to allow him a change of the Xlimit.

I claim:

1. A module for the protection of software in a computer network, the network having a plurality of workstations coupled to a network server which provides controlled access to the software by the workstations, the module comprising:
    a microprocessor for implementing an access control to the software by any of the plurality of workstations, said microprocessor being connectable via a parallel interface, particularly via a printer interface, with the network server,
    a programmable storage, being addressable by means of said microprocessor, in which a user limit code Xlimit is stored, and
    a device for processing said user limit code Xlimit and an actual user number under a processing software, said device being arranged in said module and being addressable by means of said microprocessor.

2. A module according to claim 1, comprising a second device for processing a second user limit code Ylimit, which is stored in said programmable storage, under said processing software, said second device being addressable by means of said microprocessor.

3. A module according to claim 1, comprising a device for processing a module-individual control code and/or a customer-individual identity code, which are stored in said programmable storage, under said processing software, when said Xlimit is being changed.

4. A module according to claim 1, comprising an EEPROM integrated into said microprocessor as a programmable storage.

5. A module according to claim 1, comprising a programmable storage for storing said Xlimit and/or Ylimit, as well as said module-individual control code and/or said customer-individual identity code for changing said Xlimit.

6. A device for the protection of software in a computer network, comprising a network server with at least one parallel interface and a module according to claim 1 which is connected to said network server via said parallel interface.

7. A method for the protection of software in a computer network, the network having a plurality of workstations coupled to a network server which provides controlled access to the software by the workstations, wherein the access to the software to be protected by any of the plurality of workstations, which is stored on a network server or on a workstation, is controlled by a means of a microprocessor arranged in a module, wherein said module is connectable via a parallel interface, particularly via a printer interface, with said network server, and
    a user limit code Xlimit, which is stored in a programmable storage in the module, said storage being addressable by means of said microprocessor, is processed by means of a device for processing said user limit code Xlimit under a processing software, said device being arranged within said module, wherein an actual user number is determined and compared with said user limit code.

8. A method according to claim 7, wherein a second user limit code Ylimit, which is stored in said programmable storage, is processed by a second device for processing a user limit code, which is arranged within said module and which communicates with said processing software on said network server.

9. A method according to claim 7, wherein a module-individual control code and/or a customer-individual identity code for changing said user limit code Xlimit is stored in said programmable storage and is processed by means of a processing software if a change of said Xlimit is desired.

10. A method according to claim 7, wherein an EEPROM integrated in said microprocessor is used as a programmable storage.

11. A method according to claim 7, wherein said Xlimit and/or Ylimit, as well as said module-individual control code and/or said customer-individual identity code for changing said Xlimit is stored in said programmable storage.

12. A method according to claim 7, wherein said device arranged in said module provides, as a result of said comparison of said user limit code Xlimit and said actual user number, a control information which, depending on the result of said comparison, is designed in a way that the software to be protected is either released for use or not.

13. A method for changing the XLimit of a module for the protection of software in a computer network, wherein said module and a metering device are connected to a network server or a workstation of said network via a parallel interface, said module comprising
    a microprocessor for implementing an access control to the software, said microprocessor being connectable via a parallel interface, particularly via a printer interface, with a network server or a workstation of said network,
    a programmable storage, being addressable by means of said microprocessor, in which a user limit code XLimit is stored, and
    a device for processing said user limit code XLimit, said processing allowing a comparison between the Xlimit and an actual user number under a processing software on a network server of said network, said device being arranged in said module and being addressable by means of said microprocessor,
    said metering device comprising an EEPROM in which a supply of user numbers Usupply is stored,
    said module is identified by means of a module-individual control code and/or a customer-individual identity code and said metering device is identified by means of a metering device-individual control code under a metering software stored in said computer network, said XLimit of said module and said Usupply of said metering device are determined by means of said metering software, said XLimit of said module is increased or decreased by an amount ΔXLimit under said metering software, an increase being admissible only if said Usupply is bigger than or equal to said ΔXLimit, and said Usupply is decreased or increased by said ΔXLimit, respectively, when said XLimit is increased or decreased by said ΔXLimit, respectively.

14. A metering device for changing the XLimit of a module for the protection of software in a computer network, said module comprising a microprocessor for implementing an access control to the software, said microprocessor being connectable via a parallel interface, particularly via a printer interface, with a network server or a workstation of said network, a programmable storage, being addressable by means of said microprocessor, in which a user limit code XLimit is stored, and a device for processing said user limit code XLimit, said processing allowing a comparison between the Xlimit and an actual user number under a processing software on a network server of said network, said device being arranged in said module and being addressable by means of said microprocessor, said module being identifiable by means of a module-individual control code and/or a customer-individual identity code under a metering software stored in said computer network, said metering device comprising an EEPROM in which a supply of user numbers Usupply is stored, being connectable via a parallel interface with said network server or a workstation of said network, being addressable by means of said metering software stored in said computer network, being identifiable by means of a metering device-individual control code under said metering software, being designed to allow the increase or decrease of said XLimit, respectively, by an amount ΔXLimit, the increase only if said Usupply is bigger than or equal to said ΔXLimit, corresponding to the decrease or increase of said Usupply by said ΔXLimit, respectively, and being designed to allow said increase or decrease, respectively, of said Xlimit and said corresponding decrease or increase, respectively, of said Usupply to be effected under said metering software.

* * * * *